(12) United States Patent
Matsubara et al.

(10) Patent No.: US 8,739,919 B2
(45) Date of Patent: Jun. 3, 2014

(54) MOTOR AND ELECTRIC POWER STEERING SYSTEM

(75) Inventors: Ken Matsubara, Matsubara (JP); Noboru Niguchi, Kashihara (JP); Naotake Kanda, Yamatokoriyama (JP); Toshimasa Soku, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 643 days.

(21) Appl. No.: 11/754,047

(22) Filed: May 25, 2007

(65) Prior Publication Data

US 2007/0272472 A1 Nov. 29, 2007

(30) Foreign Application Priority Data

May 29, 2006 (JP) ................................. 2006-148975

(51) Int. Cl.
*B62D 5/04* (2006.01)

(52) U.S. Cl.
CPC .................................... *B62D 5/0403* (2013.01)
USPC .......................................... 180/444; 180/443

(58) Field of Classification Search
USPC ..................................... 180/443, 444; 310/89
See application file for complete search history.

(56) References Cited

U.S. PATENT DOCUMENTS

| | | | | |
|---|---|---|---|---|
| 5,287,030 A * | 2/1994 | Nutter | | 310/89 |
| 6,404,086 B1 * | 6/2002 | Fukasaku et al. | | 310/89 |
| 6,491,131 B1 * | 12/2002 | Appleyard | | 180/444 |
| 6,644,432 B1 * | 11/2003 | Yost et al. | | 180/444 |
| 6,799,655 B2 * | 10/2004 | Hama et al. | | 180/444 |
| 6,933,631 B2 * | 8/2005 | Ogawa | | 310/49.51 |
| 7,100,734 B2 * | 9/2006 | Segawa | | 180/444 |
| 7,183,681 B2 * | 2/2007 | Segawa et al. | | 310/68 B |
| 7,663,273 B2 * | 2/2010 | Shiino et al. | | 310/59 |
| 2002/0060105 A1 * | 5/2002 | Tominaga et al. | | 180/443 |
| 2003/0094865 A1 * | 5/2003 | Sugitani | | 310/58 |
| 2003/0188918 A1 * | 10/2003 | Shimizu et al. | | 180/444 |
| 2003/0192734 A1 * | 10/2003 | Bugosh | | 180/444 |
| 2005/0178608 A1 * | 8/2005 | Shiino et al. | | 180/444 |
| 2005/0183902 A1 * | 8/2005 | Segawa et al. | | 180/444 |
| 2006/0108884 A1 * | 5/2006 | Shiino et al. | | 310/89 |
| 2006/0279146 A1 * | 12/2006 | Ishigami et al. | | 310/71 |

FOREIGN PATENT DOCUMENTS

| | | |
|---|---|---|
| JP | 6-49083 | 12/1994 |
| JP | 7-327332 | 12/1995 |
| JP | 2004-23840 | 1/2004 |

(Continued)

OTHER PUBLICATIONS

U.S. Appl. No. 11/753,744, filed May 25, 2007, Kanda, et al.

(Continued)

*Primary Examiner* — Anne Marie Boehler
*Assistant Examiner* — Maurice Williams
(74) *Attorney, Agent, or Firm* — Oblon, Spivak, McClelland, Maier & Neustadt, L.L.P.

(57) ABSTRACT

The invention provides a motor including: a cylindrical motor case having a bottom that supports an outer circumferential surface of a stator core by an inner circumferential surface thereof; and a bracket that supports an output shaft side bearing and closes an opening of the motor case; wherein the stator core is press-fitted into the motor case from the opening such that a part of the stator core is exposed from the motor case, and a part of the stator core that is not press-fitted to the motor case forms a sliding fitting wall capable of providing a sliding fitting connection with the bracket.

5 Claims, 9 Drawing Sheets

(56) References Cited

FOREIGN PATENT DOCUMENTS

| | | |
|---|---|---|
| JP | 2005-138670 | 6/2005 |
| JP | 2005-145436 | 6/2005 |
| JP | 2005-168099 | 6/2005 |
| JP | 2006-27355 | 2/2006 |

OTHER PUBLICATIONS

Office Action issued on Oct. 13, 2011 in the corresponding Japanese Patent Application No. 2006-148975 (with English Translation).

Japanese Office Action issued Jul. 26, 2011, in Patent Application No. 2006-148975 (with English-language translation).

* cited by examiner

MOTOR AND ELECTRIC POWER STEERING SYSTEM

BACKGROUND OF THE INVENTION

1. Field of the Invention

This invention relates to a motor, and an electric power steering system in which a motor is provided for assisting a steering operation such that the motor is driven and controlled based on a steering torque detected by a torque sensor.

2. Related Art

An electric power steering system for reducing load of a driver is provided with an input shaft connected to a steering member (steering wheel, steering handle etc.), an output shaft connected to control wheels through a pinion and a rack or the like, a connecting shaft that connects the input shaft and the output shaft. Based on a torsion angle caused in the connecting shaft, a steering torque applied to the input shaft is detected by a torque sensor. Then, based on the detected steering torque value, the motor for assisting the steering operation coupled to the output shaft is driven and controlled.

In such an electric power steering system, brushless motors have come to be applied to the motor for assisting the steering operation in recent years. The brushless motor is a motor that is provided with permanent magnets in a rotor and rotates the rotor by controlling a wave form generating circuit which generates magnetic field of rotation in a stator based on a (rotational) position of the rotor. Since no brush is provided, loss or mechanical noise by the brush and electrical noise by the brush are not caused.

FIG. 9 is a longitudinal cross-sectional view showing construction of a conventional motor. In this brushless motor, an output shaft side bearing 85 is supported by an inner circumferential surface of a through hole formed at a central portion of a bracket 81 that closes an opening of a cylindrical motor case 80 having a bottom. Further, the opposite side bearing 86 is supported by an inner circumferential surface of a through hole formed at a central portion of the bottom of the motor case 80.

A stator core 82 is supported by being press-fitted onto an inner circumferential surface of the motor case 80. A rotor 83 is provided around a shaft 84 (rotation shaft) supported by the bearings 85, 86 at a position opposing the stator core 82.

The motor case 80 and the bracket 81 are fitted to each other with sliding fitting walls formed in both members.

In Utility model Publication JP-Y2-06-49083 Publication, there is disclosed a stator fixing device in an electric generator in which sliding fitting walls are formed such that an outer circumferential surface of the stator at one side end is press-fitted to an inside of a rear housing of the electric generator.

Conventionally, a brushless motor for assisting a steering operation in an electric power steering system is often configured so that the stator core (or armature) is press-fitted to the motor case as described above. Since the motor case is made of steel, the density of magnetic flux in the core can be changed on its contact surfaces after press-fitting. Accordingly, there is a problem that torque loss is increased. Further, as shown in FIG. 9, it is necessary to provide a space to place the sliding fitting walls for attachment when the motor case is attached to the bracket, a housing of a speed reducer, or the like. Furthermore, due to dimensional tolerances of three parts: the stator core, the motor case and the bracket, center deviation to the rotor can be caused. Therefore, there is a problem that air gap between the rotor and the stator has to be taken large.

SUMMARY OF THE INVENTION

The present invention has been made in view of the above circumstances, and an object of the first aspect of the invention is to provide a motor which can be made in small size and the air gap between the rotor and the stator can be formed small.

An object of the second aspect of the invention is to provide a motor which can be made in small size and an air gap between a rotor and a stator can be made small so that torque loss is decreased.

An object of the third aspect of the invention is to provide an electric power steering system in which the motor as described in the first or second aspect of the invention is provided for assisting a steering operation.

A motor according to the first aspect of the invention includes:

a cylindrical motor case having a bottom that supports an outer circumferential surface of a stator core by an inner circumferential surface thereof; and a bracket that supports an output shaft side bearing and closes an opening of the motor case, and is characterized in that the stator core is press-fitted into the motor case from the opening such that a part of the stator core is exposed from the motor case, and a part of the stator core that is not press-fitted to the motor case is capable of providing a sliding fitting connection with the bracket.

A motor according to the second aspect of the invention is characterized in that the bracket is formed by a non-magnetic material.

An electric power steering system according to the third aspect of the invention includes:

a torque sensor that detects a steering torque applied by a steering member of a vehicle; and a motor according to the first or second aspect of the invention for assisting a steering operation, and the motor is driven based on the steering torque that is detected by the torque sensor so as to assist the steering operation.

According to the motor of the first aspect of the invention, since the stator core is press-fitted into the motor case from the opening such that a part of the stator core is exposed from the motor case, and a part of the stator core that is not press-fitted to the motor case is capable of providing a sliding fitting connection with the bracket, it is not necessary to provide additional space for the sliding fitting structure. Therefore, it is possible to provide the motor in small size and center alignment can be conducted without the motor case, namely conducted with dimensional tolerances of only two parts: the stator and the bracket. Therefore, it is possible to obtain a motor in which the air gap between the rotor and the stator can be made small.

According to the motor of the second aspect of the invention, since the bracket is formed by a non-magnetic material, leakage of the magnetic flux is small so that torque loss is decreased. Accordingly, it is possible to obtain a motor in small size in which the air gap between the rotor and the stator can be made small.

According to the electric power steering system of the third aspect of the invention, the torque sensor detects the steering torque applied by the steering member of the vehicle, and the motor according to the first or second aspect of the invention is driven based on the detected steering torque for assisting the steering operation. Therefore, it is possible to obtain an electric power steering system in which the motor for assisting the steering operation can be made in small size and the air gap between the rotor and the stator can be made small.

DETAILED DESCRIPTION OF THE PREFERRED EMBODIMENTS

Preferred embodiments of the present invention will now be described in detail with reference to the drawings.

Embodiment 1

Figure 1:
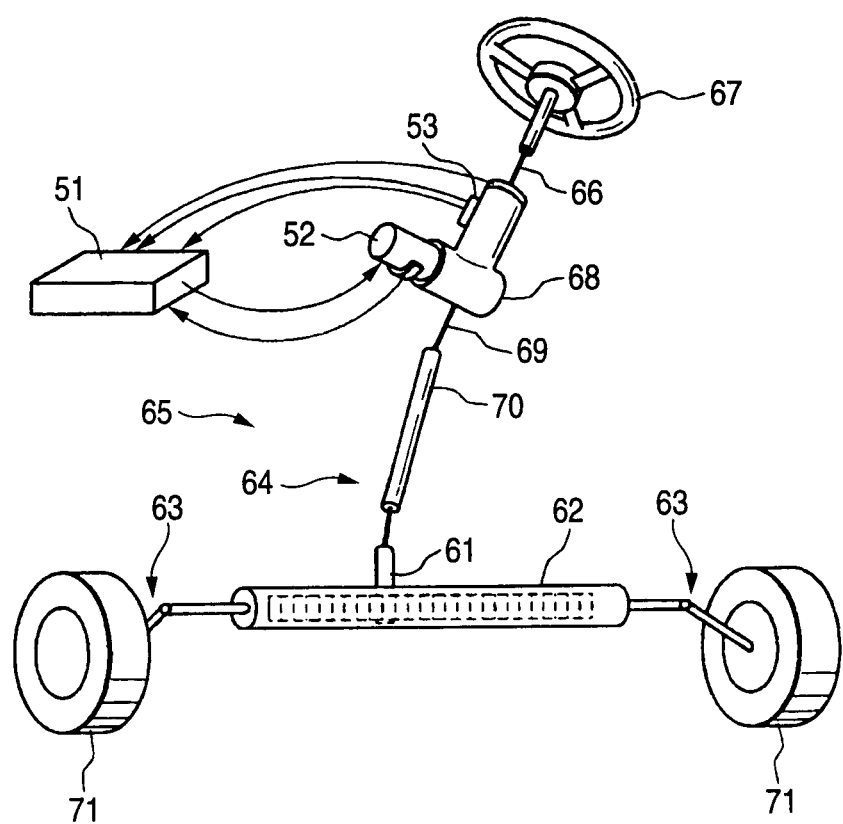
FIG. 1 is a schematic view showing an electric power steering system according to Embodiment 1 of the invention.

FIG. 1 is a schematic view showing construction of an electric power steering system according to Embodiment 1 of the invention. The electric power steering system includes a steering member (steering wheel, or steering handle) 67 for a steering operation, a motor 52 for assisting the steering operation as brushless motor that is driven according to the steering operation of the steering member 67, a transmitting device 64 for transmitting rotation of the motor 52 to steering mechanisms 63,63 through a reduction gear mechanism 68 and a drive control unit 51 for driving and controlling the motor 52. The steering member 67 is connected to an input shaft 66.

The transmitting device 64 includes an output shaft 69 connected to the input shaft 66 through a torsion bar (not shown), a connecting shaft 70 coupled to the output shaft 69 through a universal joint, a pinion shaft 61 coupled to the connecting shaft 70 through another universal joint and a rack shaft 62 which has rack teeth meshed with a pinion of the pinion shaft 61 and that is connected to control wheels 71,71 through the steering mechanisms 63,63. The input shaft 66 and the transmitting device 64 form a steering shaft 65.

Surrounding the input shaft 66, a torque sensor 53 is disposed so as to detect a steering torque value based on a torsion caused in the torsion bar that is applied to the input shaft 66 when the steering member 67 is operated. The drive control unit 51 is configured to drive and control the motor 52 based on the steering torque value detected by the torque sensor 53.

The reduction gear mechanism 68 includes a worm gear connected to the output shaft of the motor 52 and a worm wheel fitted at the middle of the output shaft 69, such that rotation of the motor 52 is transmitted to the output shaft 69 through the worm gear and the worm wheel.

In the electric power steering system as described above, a steering effort by the steering operation of the steering member 67 is transmitted to the rack shaft 62 through the input shaft 66, the torsion bar (not shown), the output shaft 69, the connecting shaft 70 and the pinion shaft 61, so that the rack shaft 62 is moved along its longitudinal direction to actuate the steering mechanisms 63,63. Meanwhile, based on the steering torque value detected by the torque sensor 53, the drive control unit 51 drives and controls the motor 52 so that the driving force of the motor 52 is transmitted to the output shaft 69. Thus, the system assists the steering effort of the driver to reduce working load.

Figure 2:
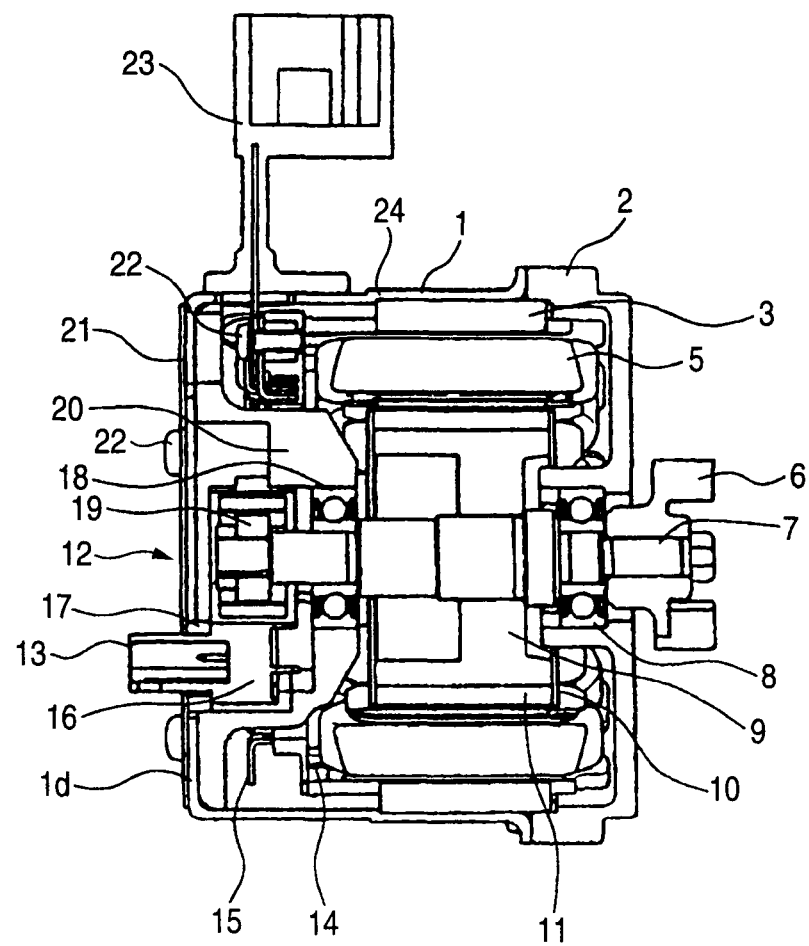
FIG. 2 is a longitudinal sectional view showing construction of a motor according to an embodiment of the invention.

FIG. 2 is a longitudinal sectional view along a plane passing a rotation shaft of the motor 52 as an embodiment of a motor according to the invention.

The motor 52 is configured so that a cylindrical motor case 1 having a bottom supports an outer circumferential surface of a stator core 3 on its inner circumferential surface and a through hole is formed at the center of the bottom on one side of the motor case 1. A stator coil 5 is wound on the stator core 3 to form a stator.

A bracket 2 closes an opening formed on the other side (second side) of the motor case 1. The bracket 2 supports an output shaft side bearing 8 located on the other side (second side) of a rotation shaft 7 on an inner circumferential surface of a through hole formed at the center of the bracket 2.

Figure 3:
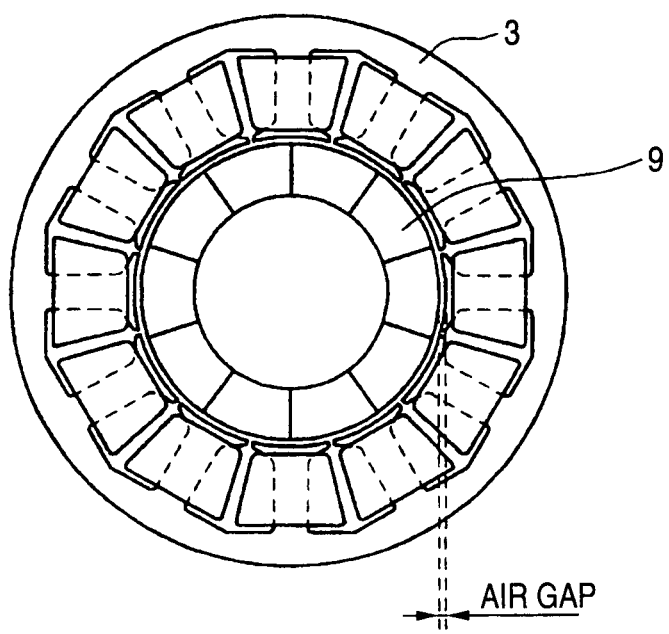
FIG. 3 is an explanatory figure showing an air gap.

The stator core 3 is press-fitted to the motor case 1 from the opening to a step portion 24 formed on the inner circumferential surface of the motor case 1 such that a part of the stator core 3 is exposed from the motor case 1. A part of the stator core 3 that is not press-fitted to the motor case 1 is capable of providing a sliding fitting connection with the bracket 2. By this structure, center alignment can be conducted only with dimensional tolerances of two parts: the stator core 3 and the bracket 2, namely, without the motor case 1. Therefore, air gap between the rotor 9 and the stator core 3 as shown in the sectional view of FIG. 3 can be made small. For example, the air gap can be 0.6 mm or less, so that output efficiency of the motor can be increased.

The bracket 2 is made of aluminum as a non-magnetic material, which decreases torque loss by lowering leakage of magnetic flux as compared with a case that the bracket 2 is made of steel (S55C).

An opposite side bearing 18 located on one side (first side) of the rotation shaft 7 is supported on an inner circumferential surface of a through hole formed at the center of a bottom of a cylindrical end housing 20 with bottom. On one side end of the end housing 20, a flange portion is formed on outer periphery of the end housing 20. The end housing 20 is inserted or press-fitted to the motor case 1 from its opening, such that the flange portion is brought into contact with the bottom of the motor case 1.

A bus-bar housing 14 is formed on the outer circumferential surface of the cylindrical portion of the end housing 20. A resolver rotor 19 of a resolver (rotation angle sensor) 12 that detects a rotational position of the motor rotor and a resolver stator 16 provided around the outer circumference of the resolver rotor 19 are housed within the cylindrical portion of the end housing 20.

Power supply lines and signal lines of the resolver 12 are connected to the drive control unit 51 through a connector 13. The connector 13 is fitted into a grommet 17 attached to a hole formed on an end cover 21.

A rotor yoke 9 is disposed so as to circumferentially face the stator coil 5 of the rotation shaft 7. Magnets 11 are adhered on the outer circumferential surface of the rotor yoke 9 to form a ring shape. The rotor yoke 9 and the magnets 11 are entirely housed in a protection tube 10 to form the motor rotor. The rotor yoke 9 is formed by sinter forming such that the rotor yoke 9 is thinned from both axial ends.

A connector 23 for connection with a drive control unit 51 is provided at a location adjacent to the bottom of the motor case 1 on a circumferential surface of the motor case 1, each of motor-side terminals of the connector 23 passes through a hole formed on the outer circumferential surface of the motor case 1 so as to project into the motor case 1 and is screwed to the corresponding terminal of the bus bar 15 through a screw 22.

The end cover 21 has a shape substantially overlapping with the bottom 1d of the motor case 1 and covers the bottom of the motor case 1 and the resolver 12 so as to prevent the infiltration of contaminations. As described above, the end cover 21 is screwed by screws 22 fixed in three screw holes formed on the end housing 20, penetrating through three through holes formed on a peripheral portion of the end cover 21 as well as three through holes formed on the bottom of the motor case 1 corresponding to the holes on the end housing 20.

Embodiment 2

Figure 4:
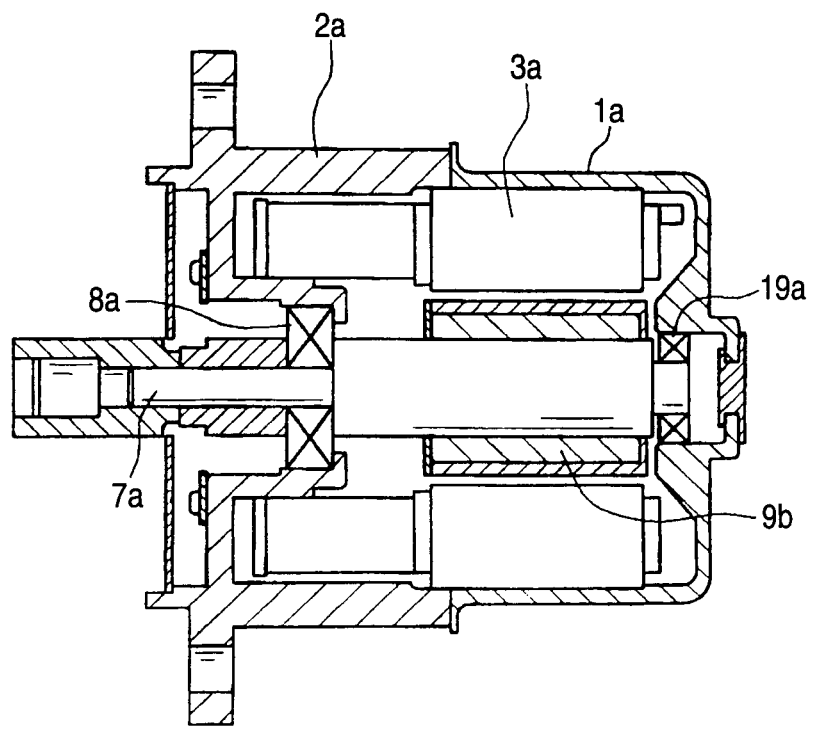
FIG. 4 is a longitudinal sectional view showing construction of a brushless motor as a motor according to Embodiment 2 of the invention.

FIG. 4 is a longitudinal cross-sectional view showing construction of a brushless motor as a motor according to Embodiment 2 of the invention.

In this brushless motor, an inner circumferential surface of a through hole formed at a center portion of a bracket 2a which closes an opening of a cylindrical motor case 1a having a bottom supports an output shaft side bearing 8a. Further, an inner circumferential surface of a through hole formed at a center portion on the bottom of the motor case 1a supports an opposite side bearing 19a.

A stator core 3a is supported by an inner circumferential surface of the motor case 1a by being press-fitted thereto from the opening. A rotor 9b is disposed at a position opposing the stator core 3a on a shaft 7a (rotation shaft) supported by the bearings 8a,19b.

The stator core 3a is press-fitted to the motor case 1a such that a part of the stator core 3a is exposed from the motor case 1a. A part of the stator core 3a that is not press-fitted into the motor case 1a forms a sliding fitting wall that is capable of providing a sliding fitting connection with the bracket 2a. The stator core 3a and the bracket 2a are fitted with each other by the sliding fitting structure.

Embodiment 3

Figure 5:
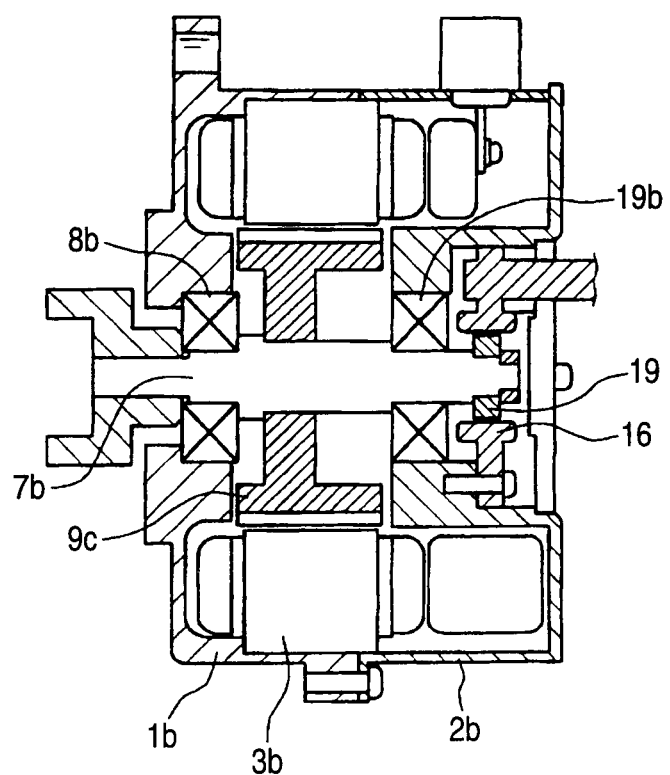
FIG. 5 is a longitudinal sectional view showing construction of a brushless motor as a motor according to Embodiment 3 of the invention.

FIG. 5 is a longitudinal cross-sectional view showing construction of a brushless motor as a motor according to Embodiment 3 of the invention.

In this brushless motor, an inner circumferential surface of a through hole formed at a center portion on a bottom of a cylindrical motor case 1b with bottom supports an output shaft side bearing 8b. Further, an inner circumferential surface of a through hole formed at a center portion of a bracket 2b that closes an opening of the motor case 1b supports an opposite side bearing 19b.

A stator core 3b is supported by an inner circumferential surface of the motor case 1b by being press-fitted thereto from the opening to a step portion formed on the inner circumferential surface of the motor case 1b such that a part of the stator core 3b is exposed from the motor case 1b. A part of the stator core 3b that is not press-fitted to the motor case 1b forms a sliding fitting wall that is capable of providing a sliding fitting connection with the bracket 2b. The stator core 3b and the bracket 2b are fitted with each other by the sliding fitting structure.

A rotor 9c is disposed at a position opposing the stator core 3b on a shaft 7b (rotation shaft) supported by the bearings 8b,19c.

Embodiment 4

Figure 6:
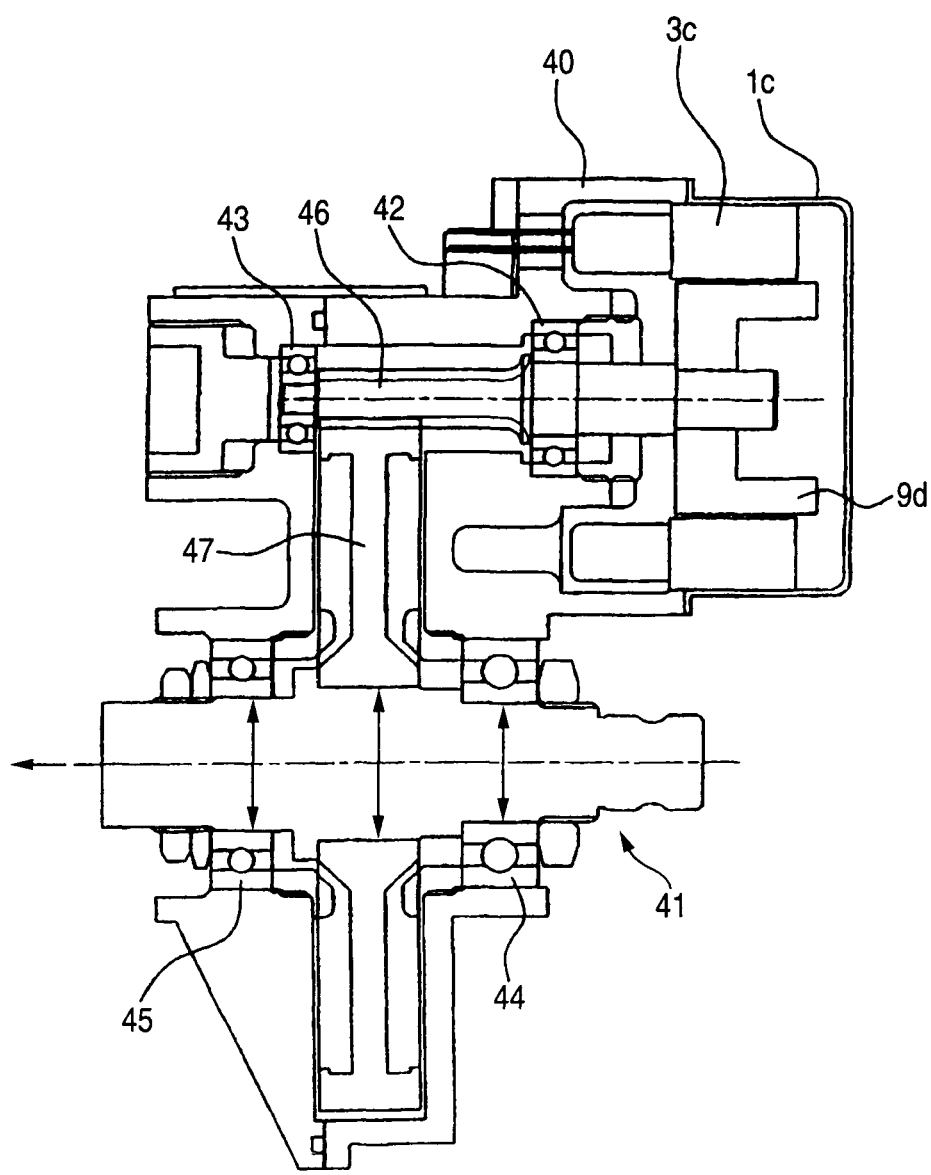
FIG. 6 is a longitudinal sectional view showing construction of a brushless motor as a motor according to Embodiment 4 of the invention.

FIG. 6 is a longitudinal cross-sectional view showing construction of a brushless motor as a motor according to Embodiment 4 of the invention.

In this brushless motor, two bearings 42,43 support a shaft 46 (rotation shaft) within a housing 40 of a speed reducer in an electronic power steering system 1c that closes an opening of a cylindrical motor case 1c having a bottom.

A stator core 3c is supported by an inner circumferential surface of the motor case 1c by being press-fitted thereto from the opening. A rotor 9d is disposed at a position opposing the stator core 3c on the shaft 46.

The stator core 3c is press-fitted to the motor case 1c such that a part of the stator core 3c is exposed from the motor case 1c. A part of the stator core 3c that is not press-fitted to the motor case 1c forms a sliding fitting wall capable of forming a sliding fitting with the housing 40 of the speed reducer. The stator core 3c and the housing 40 of the speed reducer are fitted with each other by the sliding fitting structure.

Rotation speed of the brushless motor is reduced in accordance with a ratio in number of teeth between a helical gear formed on the shaft 46 and a helical gear 47 which is formed on a steering shaft 41 supported by two bearings 44,45 in the housing 40 of the speed reducer so as to have a larger diameter than the helical gear on the shaft 46.

Disclosure of Other Embodiment

Figure 7:
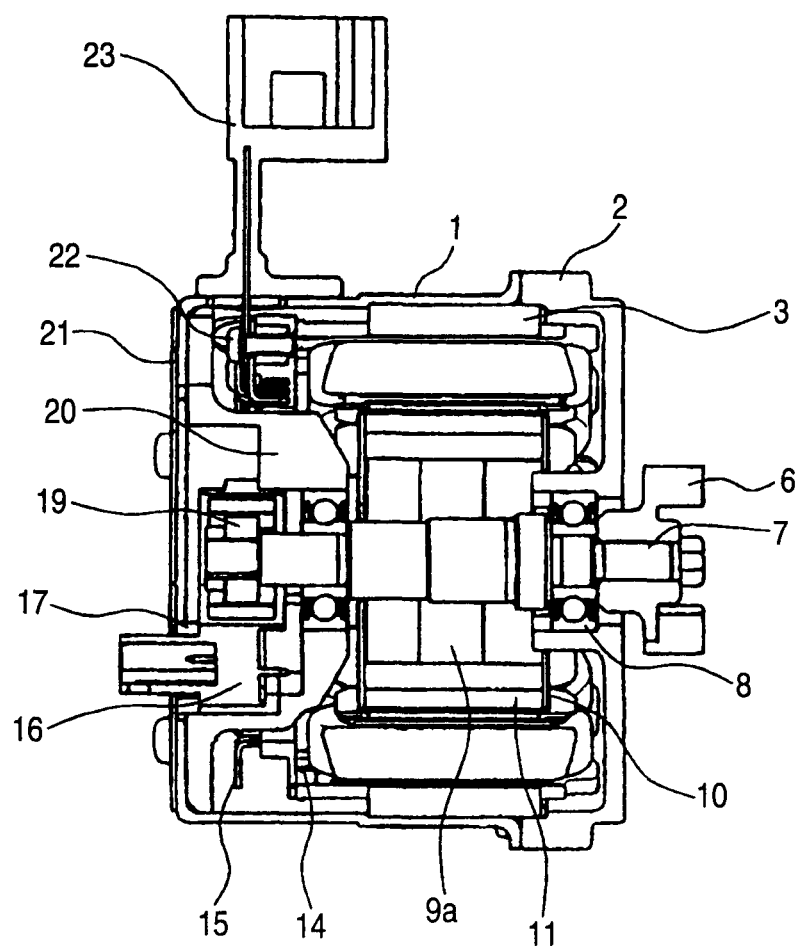
FIG. 7 is a longitudinal sectional view showing construction of a brushless motor as a motor according to other embodiment of the invention.
Figure 8:
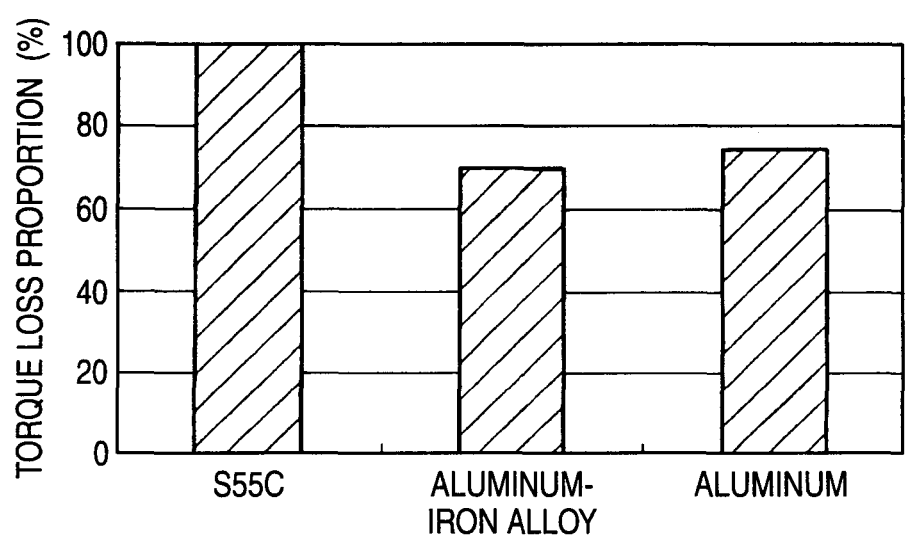
FIG. 8 is a graph showing difference in torque loss according to material.
Figure 9:
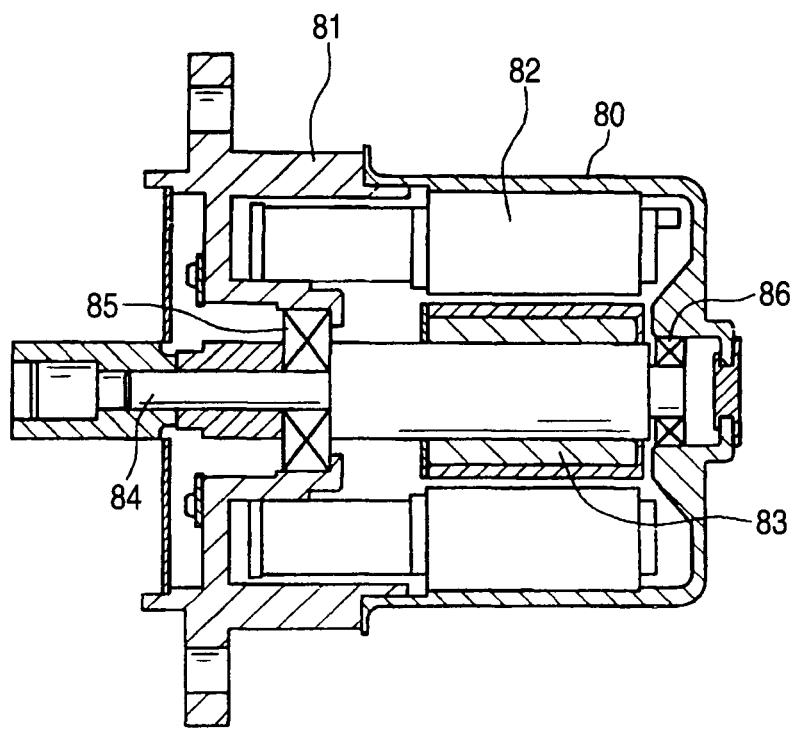
FIG. 9 is a longitudinal cross-sectional view showing construction of a conventional motor.

FIG. 7 is a longitudinal sectional view showing construction of a brushless motor as a motor according to other embodiment of the invention.

In this brushless motor, a rotor yoke 9a is formed by sinter forming such that the rotor yoke 9a is thinned from both axial ends. Further, the rotor yoke 9a has a symmetric shape in its axial direction. Further, in order to increase heat radiation efficiency, the rotor yoke 9a is provided with fins. Construction of the other parts of this brushless motor is basically the same as that of the brushless motor described with FIG. 2. Detailed explanation of this embodiment is omitted.

The embodiments described above are to be regard as illustrative rather than restrictive. Variations and changes may be made by others, and equivalents employed, without departing from spirit of the present invention. Accordingly, it is intended that all variation, changes and equivalents which fall within the spirit and scope of the present invention as defined in the claims be embraced thereby.

This application is based on and claims a priority from Japanese Patent Application No. 2006-148975 filed on May 29, 2006, the entire content of which are incorporated by reference.

What is claimed is:

1. A motor comprising:
    a stator core;
    a rotor comprising a plurality of magnets and an integral rotation shaft;
    an output side bearing that engages and rotationally supports an output side of the rotation shaft;
    a cylindrical motor case having a bottom that supports an outer circumferential surface of the stator core by an inner circumferential surface thereof; and
    a bracket that directly supports the output side bearing and closes an opening of the motor case;
    an end housing that press-fits into the cylindrical motor case, the end housing including a through hole that directly supports another bearing at a side of the rotor opposite the output side bearing; and
    a cover that overlaps the bottom of the motor case and that covers the end housing,
    wherein the stator core includes a first portion that press-fits into the motor case from the opening and a second portion that extends from the first portion beyond an end of the motor case, the second portion including a sliding fitting connection with the bracket to align a center of the bracket to a center of the rotation shaft based on the stator core, and wherein the motor is a brushless motor.

2. A motor according to claim 1, wherein the bracket is formed by a non-magnetic material.

3. An electric power steering system comprising:
a torque sensor that detects a steering torque applied by a steering member of a vehicle; and
a motor according to claim 1 for assisting a steering operation;
wherein the motor is driven based on the steering torque that is detected by the torque sensor so as to assist the steering operation.

4. A motor according to claim 1, wherein the center of the bracket is aligned based on the stator core independent of the motor case.

5. A motor according to claim 1, wherein an inner diameter of the first portion is less than an inner diameter of the second portion.

\* \* \* \* \*